Figure 1:
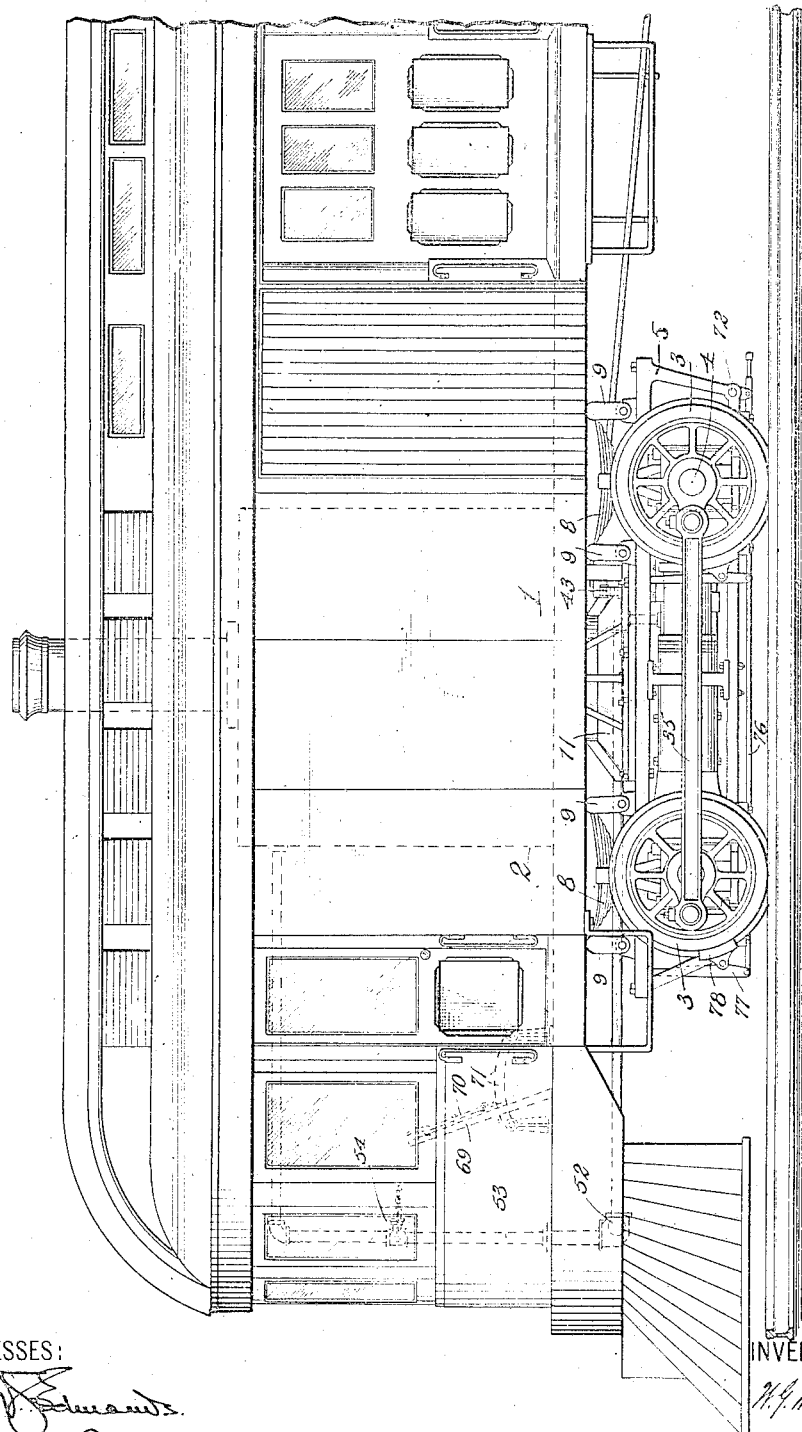

No. 830,940. PATENTED SEPT. 11, 1906.
W. G. WAGENHALS.
STEAM MOTOR CAR.
APPLICATION FILED MAY 18, 1906.

4 SHEETS—SHEET 1.

WITNESSES:
W. Edmonds.
E. C. Kuckers.

INVENTOR
W. G. Wagenhals

BY
J. C. Edmonds
ATTORNEY

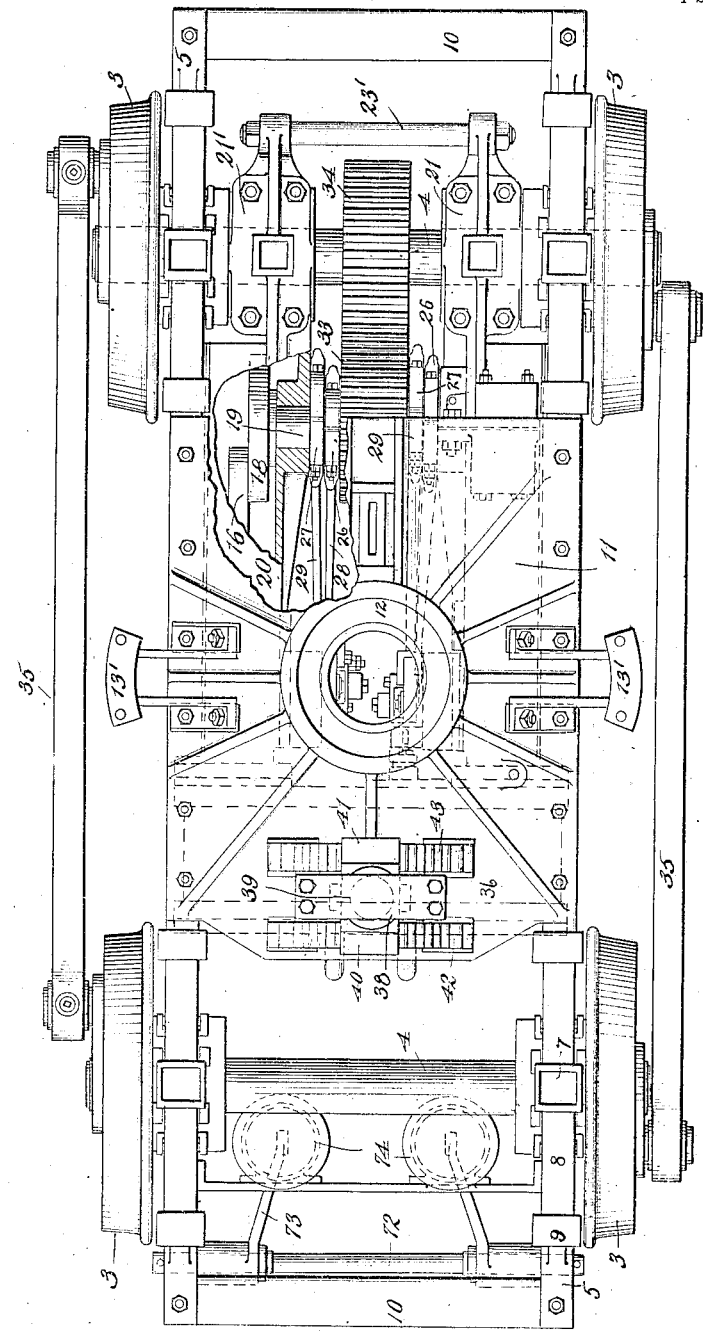

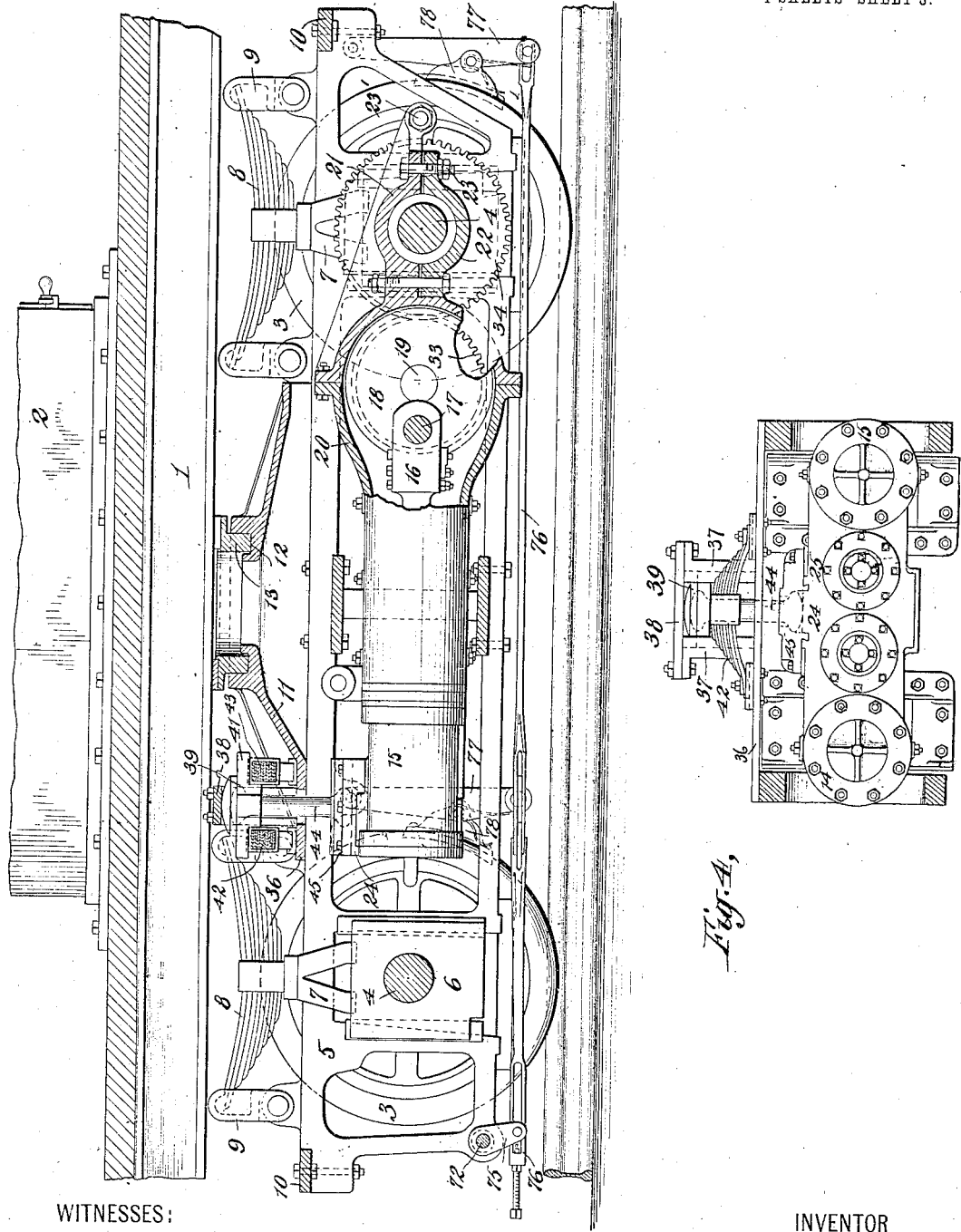

No. 830,940. PATENTED SEPT. 11, 1906.
W. G. WAGENHALS.
STEAM MOTOR CAR.
APPLICATION FILED MAY 18, 1906.

4 SHEETS—SHEET 4.

WITNESSES:
INVENTOR
W. G. Wagenhals
BY
ATTORNEY

UNITED STATES PATENT OFFICE.

WILLIAM G. WAGENHALS, OF ST. LOUIS, MISSOURI.

STEAM-MOTOR CAR.

No. 830,940.  Specification of Letters Patent.  Patented Sept. 11, 1906.

Application filed May 18, 1906. Serial No. 317,601.

*To all whom it may concern:*

Be it known that I, WILLIAM G. WAGENHALS, a citizen of the United States, residing at St. Louis, in the State of Missouri, have invented certain new and useful Improvements in Steam-Motor Cars, of which the following is a specification.

The object of my invention is to provide a self-propelled car adapted more particularly for use on comparatively short railway-lines which are tributary to the main lines of a railway system. For this use a car should be of considerable size and should have a self-contained driving mechanism compactly arranged, so as to leave as much space as possible available for passengers, baggage, and other purposes. The size of such cars necessitates mounting the car-body on bogie-trucks which can move relatively to the car-body when the car is rounding a curve, and therefore provision must be made for sufficient flexibility to permit such movement in the devices for transmitting power from the motor to the wheels of the truck or in the devices for controlling the operation of the motor from the car-body when the motor is mounted directly upon the truck.

My invention contemplates the employment of a steam-engine to furnish the motive power of the car. This engine I mount upon one of the trucks to which the car-body is pivoted. Steam is supplied to the engine by a boiler located within the car-body in a small compartment at the forward end, which, though occupying comparatively small space, is of sufficient size to provide room, in addition to that required for the boiler, for the controlling mechanism of the car and for the operator.

One feature of my invention resides in the arrangement of the parts of the motive devices, more particularly the mounting of the engine on the truck. Preferably I employ a four-wheel bogie-truck, and the engine is arranged between the two axles, as in this way space available for passengers and baggage is not taken up by the engine. Though the engine may be connected directly to the axle of the truck, I prefer to employ suitable gearing to effect this driving connection.

In order that the engine may not be subjected to continual jarring when the car is running, I provide a yielding support for the engine so arranged as to take up the vibration while maintaining the engine always in driving relation to the axles of the truck. In the construction I prefer to employ the casing of the engine is extended at one end, and bearings are provided in this extension for one of the axles of the truck, so that the entire engine can swing about this axle. The other end of the engine is supported by springs, and therefore the entire engine can move to a limited extent independently of the truck, such movement being cushioned by these supporting-springs.

The employment of trucks which are pivoted to the car-body requires that the controlling mechanism be arranged to permit of movement of the truck relatively to the car-body while maintaining the operative connections. Also the mechanism must be arranged to provide for such movement of the engine as is permitted by its supporting-springs. I therefore so construct the piping for carrying steam from the boiler to the engine as to permit such movement while always providing a free passage for the steam, preferably by inserting ball-and-extension joints therein. Also the lever system for actuating the reversing-gear is arranged so as to be operative in any position of the truck relatively to the car-body. If air-brakes are employed, flexible piping may be provided for carrying compressed air to brake-cylinders on the truck.

My invention will be better understood by reference to the accompanying drawings, which show the preferred embodiment thereof, and in which—

Figure 5:
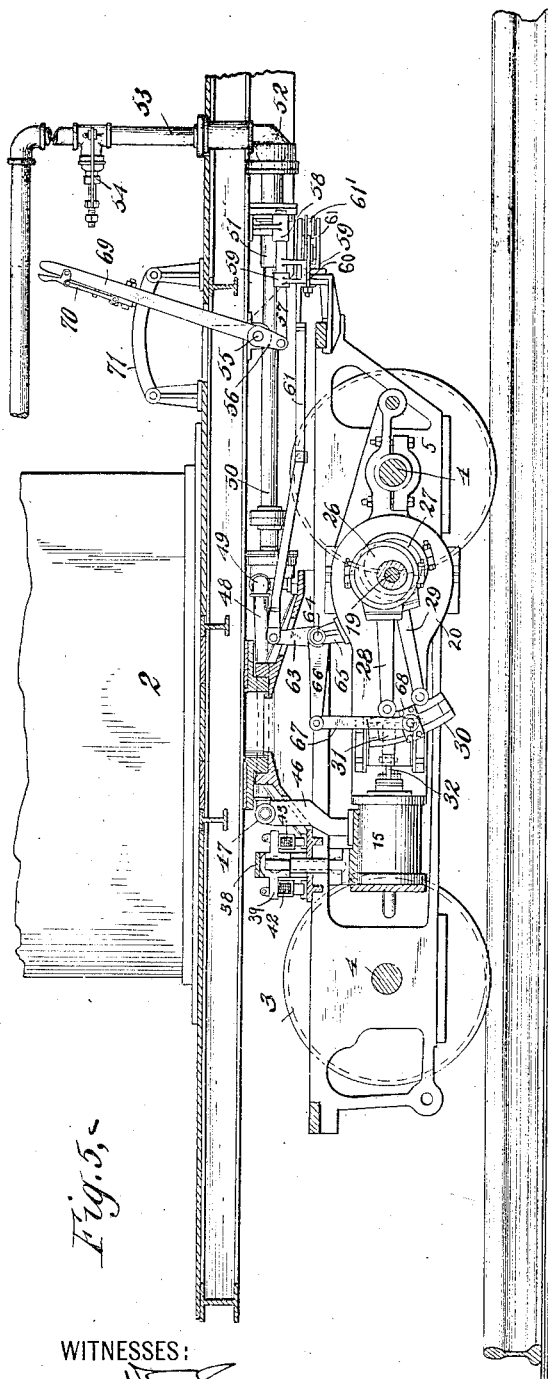
Figure 6:
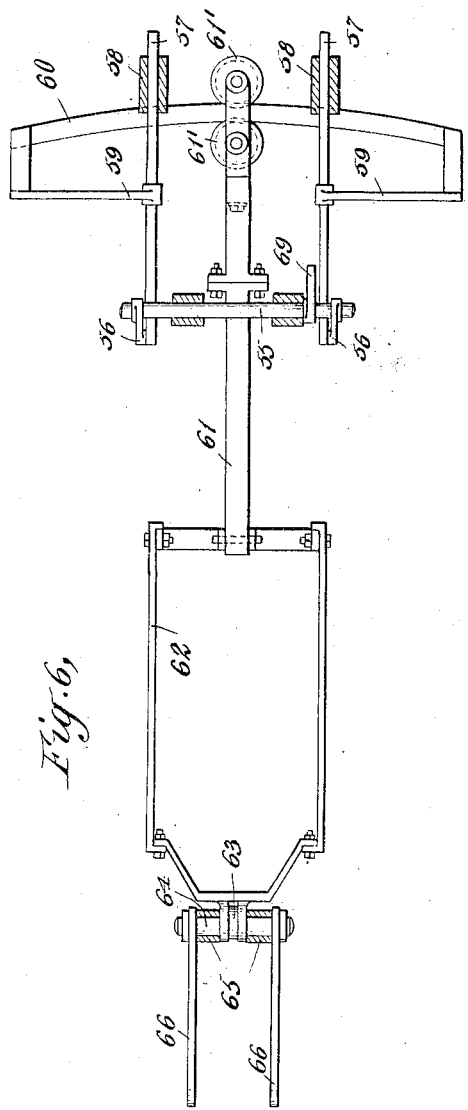

Figure 1 is an elevation of the forward end of the car. Fig. 2 is a plan view of the motor-truck broken away and sectioned in part. Fig. 3 is a section of the truck with parts broken away. Fig. 4 is an end view of the engine, showing the spring-support therefor. Fig. 5 is a section of the truck, partly in diagram and showing the controlling mechanism; and Fig. 6 is a top view of the mechanism for operating the reversing-gear.

Referring to the drawings, the car-body (indicated by the numeral 1) is mounted on two bogie-trucks, one adjacent to either end thereof. The body is of considerable length and is arranged for passengers or baggage, except for a small compartment at the forward end, in which are the boiler 2 and, forward of the boiler, the controlling devices and sufficient space for the operator. The motor-truck is preferably of the four-wheel type, the pairs of wheels 3 being mounted on axles 4. The side frames 5 of the truck have ways formed therein in which the journal-bearings 6 for the axles 4 are vertically movable. Each of the journal-boxes is connected by a member 7 to a bundle of leaf-springs 8, the ends of which enter sockets in links 9, which are pivotally connected at their lower ends to the side frames 5. Suitable braces 10 extend across between the side frames 5. Secured upon the upper edges of the side frames 5 is a bearing-plate 11. This is a heavy casting and is ribbed to give it greater strength. The central portion of plate 11 is raised, as shown in Fig. 3, and a central opening is formed therein. About this opening is an annular groove 12, Fig. 3, forming a bearing to receive the depending cylindrical wall on bearing-piece 13, which is secured to the bottom of the car-body 1. The axis of this bearing is that about which the truck turns relatively to the car-body. Lateral swaying of the car-body is prevented by the side bearings 13', which are s ured upon plate 11, as shown in Fig. 2. It v ll be seen that by this construction the car-body is yieldingly supported upon the wheels of the truck and the truck can turn about its pivotal axis relatively to the car-body when the car is rounding a curve. A more detailed description of these parts of the car is considered unnecessary, as they will be readily understood by those skilled in the art.

The engine, which is preferably of the two-cylinder type, is supported between the two axles of the truck at one end by one of the axles and at the other end by suitable springs. The cylinders (indicated at 14 and 15) of the engine have the usual pistons adapted to reciprocate therein, and these are connected by connecting-rods 16 with wrist-pins 17, mounted eccentrically upon disks 18. The two cylinders and the valve-boxes therefor are built together in a single rigid structure; but separate casings are provided for each piston-rod and its connecting-rod 16 and disk 18, as shown at 20, Figs. 2 and 3. The disks 18 are keyed on the shaft 19, which extends across between the two casings 20 and is journaled in suitable bearings formed in the adjacent walls of the two casings. The casings 20 are extended at the forward end of the truck, as shown at 21 21', and these extensions are so formed as to provide bearings in which the forward axle 4 of the truck rotates freely. For convenience in assembling the parts these bearings for axle 4 are divided horizontally, the lower portions 22 being secured to the upper portions by bolts 23. In order to stiffen the construction, a heavy bar 23' is employed, connecting the ends of the extensions 21 21'. Between the cylinders 14 and 15 of the engine are the valve-chests 24 and 25, which may be of the usual or any suitable construction, the movable member of each of these valves being reciprocated by eccentrics 26 and 27, mounted on shaft 19. The connection between each pair of eccentrics 26 and 27 and the movable valve member actuated thereby includes a Stephenson link-motion of the usual construction. This is best shown in Fig. 5, from which it will be seen that eccentrics 26 27 are connected by rods 28 29 with a link 30 having an arc-shaped slot therein, the walls of which are provided with grooves into which extend tongues on a block 31, adapted to slide back and forth between the ends of the arc-shaped slot. This block 31 is connected by a rod 32 with the movable member of the valve. The mechanism for effecting the movement of link 30 will be hereinafter described.

Keyed on shaft 19 between the two pairs of eccentrics, as shown in Fig. 2, is a pinion 33, which meshes with a gear 34, secured on axle 4, and by means of this gearing the power of the engine is transmitted from shaft 19 to axle 4 and the wheels 3 secured thereon. Connecting-rods 35 connect each wheel on the forward shaft 4 with the corresponding wheel on the rear shaft, so that the power of the engine is applied to all four wheels of the truck.

The bearing-plate 11 is so shaped as to provide adjacent to its rearward edge a horizontal portion 36, Fig. 3, near the center of which is an opening. Secured on the plate on either side of this opening is a standard 37, Fig. 4, the upper ends of these standards being connected by a brace 38. The adjacent walls of standards 37 have vertical grooves formed therein, into which extend tongues on a vertically-movable block 39. This block has laterally-extending portions 40 and 41, each of which extends across the top of a bundle of leaf-springs 42 and 43, arranged parallel to each other and having their ends secured to the plate 11. In the under side of block 39 is a socket formed to receive the rounded head of a pin 44, Fig. 4, the shank of which extends through the opening in plate 11. On the lower end of pin 44 is a similar rounded head, which is received in a socket formed in a plate 45, which is bolted to the casing of the engine. It will be seen that by this construction the engine is located between the two axles of the truck and is supported at one end by one of the axles and at the other end by the springs 42 43. These springs permit movement of the engine independently of the truck and take up vibration. However, the engine is at all times in driving relation to the axle of the truck, since the movement of the engine permitted by springs 42 43 is about the forward axle 4 as an axis.

Steam is supplied to the cylinders of the engine by pipes leading from the boiler in the car-body to the steam-chests 24 25. Since the truck on which the engine is mounted is pivoted to the car-body and since the engine is movably supported on springs, this piping must be arranged to permit movement of the engine relatively to the car-body. I therefore provide a pipe 46 entering the steam-chests and connected by a ball-joint 47 with a pipe 48, which is in turn connected by a ball-joint 49 with the pipe 50. In the pipe 50 is an extension-joint 51, such that this length of piping can be extended or contracted as required by the movements of the truck, the parts thereof telescoping more or less. The other end of pipe 50 is connected by a ball-joint 52 with a pipe 53, leading up through the floor of the car and to the boiler. The throttle-valve 54 is connected in pipe 53 and arranged in a position convenient for the operator. By this arrangement of the piping a free passage is provided for the steam from the boiler to the engine irrespective of the position of the engine and truck and during the movements of the truck relatively to the car-body and the engine relatively to the truck.

The direction of rotation of shaft 19 is controlled by a lever in the compartment occupied by the operator and which is arranged to operate the links 30. Mounted in bearings on the under side of the car-floor is a shaft 55, from which depend crank-arms 56. Each of these crank-arms is pivotally connected to one end of a rod 57, the other end of which is adapted to slide freely in a hanger 58, secured to the under side of the car-floor. Depending from the rods 57 are arms 59, to which is secured a segment 60 curved about the pivotal axis of the truck as a center. Two parallel bars 61, extending one on either side of the segment 60, have rollers 61' journaled therein and bearing one on the forward and the other on the rearward edge of segment 60. The bars 61 are pivotally connected to a frame 62, the rearward end of which is pivotally connected to a crank 63, carried by a shaft 64, mounted for rotation in bearings 65, secured on the casing of the engine. Two crank-arms 66 are secured on shaft 64 and extend horizontally therefrom, and to the end of each of these arms is pivotally connected a link 67, the lower end of which is pivoted to a plate 68, secured to one of the links 30. The shaft 55 is operated by means of an operating-handle 69, secured thereon and extending up through a slot in the car-floor to a position convenient for the operator. Preferably a spring-pressed latch 70, coöperating with notches in a segment 71, is provided for holding lever 69 in any one of its operative positions. It will be seen that by moving lever 69 rods 57, segment 60, and frame 62 are moved horizontally, thereby rocking shaft 64 and raising or lowering links 67 and links 30 so that the eccentrics 26 and 27 actuate the movable members of the valves controlling the supply of steam to the engine-cylinders in the desired manner. Also it will be seen that the employment of a segment 60 and the bars 61 operatively connected thereto in a manner permitting relative movement is such that in any position of the truck relatively to the car-body or while the truck is moving relatively to the car-body the operator has complete control of the position of links 30. The horizontal pivots in the connections to the reversing-gear provide for the movement of the engine permitted by its supporting-springs.

The braking devices which I prefer to employ are illustrated in Figs. 2 and 3. Extending between the side frames 5 and rotatable in bearings formed therein is a shaft 72, on which are secured arms 73, pivotally connected to the piston-rods of pistons adapted to reciprocate in brake-cylinders 74, mounted on the frame of the truck in any suitable manner. Also secured on shaft 72 are two crank-arms 75, pivotally connected to brake-rods 76, extending the whole length of the truck. Each of the rods 76 is pivotally connected to the lower ends of links 77, the upper ends of which are pivoted to the frame, and on each of these links is pivotally mounted a brake-shoe 78. By this construction the admission of air to brake-cylinders 74 operates shaft 72, thereby moving brake-rods 76 lengthwise and bringing the brake-shoes 78 into contact with the wheels 3.

Having described my invention, what I claim as new, and desire to secure by Letters Patent, is—

1. In a car, the combination of a bogie-truck, a car-body pivotally mounted thereon, a boiler carried by the car-body, a steam-engine mounted on the truck and connected in driving relation to one of the axles thereof, connections for carrying steam from the boiler to the engine, valves controlling the admission of the steam to the engine, mechanism for operating said valves, and means connected to said mechanism and actuated from the car-body for reversing the direction in which the engine drives the truck in any position of the truck relatively to the car-body, substantially as described.

2. In a car, the combination of a bogie-truck, a car-body pivotally mounted thereon, a boiler carried by the car-body, an engine mounted on the truck between the axles thereof and connected in driving relation to one of said axles, springs yieldingly supporting the engine upon the truck, connecting-rods transmitting the power of the engine from one axle of the truck to the other, connections for carrying steam from the boiler to the engine, valves controlling the admission of the steam to the engine, mechanism for operating said valves, and means connected to said mechanism and actuated from the car-body for reversing the direction in which the engine drives the truck in any position of the truck relatively to the car-body, substantially as described.

3. In a car, the combination of a bogie-truck having axles and wheels, a car-body pivotally mounted thereon, a boiler on said car-body, an engine upon said truck between the axles thereof, means supporting said engine at one end upon an axle of the truck, springs supporting the other end of the engine, connections for carrying steam from the boiler to the engine, a shaft driven by the engine, gearing between said shaft and said axle of the truck, an eccentric on said shaft, and a rod actuated by said eccentric and connected to the movable valve member of the engine, substantially as described.

4. In a car, the combination of a bogie-truck, a car-body pivotally mounted thereon, an engine upon the truck supported at one end upon one of the axles thereof and connected in driving relation to said axle, supporting-springs, and a pin connected thereto and coacting with the other end of the engine for yieldingly supporting the same, substantially as described.

5. In a car, the combination with a bogie-truck having axles and wheels and a car-body pivotally mounted thereon, of a boiler on said car-body, an engine upon the truck, a shaft driven by the engine, gearing between said shaft and one of the axles of the truck, flexible connections for carrying steam from the boiler to the engine, an eccentric on said shaft, and a rod actuated thereby and connected to the movable valve member of the engine, substantially as described.

6. In a car, the combination with a truck having axles and wheels, of a steam-engine located between the axles of the truck, a shaft driven by the engine, gearing between said shaft and one of the axles, an eccentric on said shaft and a rod actuated thereby and connected to the movable valve member of the engine, substantially as described.

7. In a car, the combination with a truck having axles and wheels of a steam-engine mounted on the truck between the axles thereof, a casing for said engine, a shaft mounted in bearings in said casing and actuated by the engine, gearing between said shaft and one of the axles of the truck, an eccentric on said shaft and a rod actuated thereby and connected to the movable valve member of the engine, substantially as described.

8. In a car, the combination with a truck having axles and wheels, of a steam-engine mounted on the truck between the axles thereof, a casing for said engine, bearings formed in said casing through which one of the axles of the truck extends, a support for the other end of the engine, a shaft mounted in bearings formed in said casing and arranged to be driven by the engine, gearing between said shaft and an axle of the truck, an eccentric on said shaft and a rod actuated thereby and connected to the movable valve member of the engine, substantially as described.

9. In a car, the combination of a truck having axles and wheels, of a steam-engine mounted on the truck between the axles thereof, a casing for said engine, bearings formed in said casing through which one of the axles of the truck extends, springs supporting the other end of the engine, a shaft mounted in bearings formed in said casing and arranged to be driven by the engine, gearing between said shaft and an axle of the truck, an eccentric on said shaft and a rod actuated thereby and connected to the movable valve member of the engine, substantially as described.

10. In a car, the combination with a truck having axles and wheels, of an engine yieldingly supported on said truck, said support including a pin, a member having a socket therein into which the end of said pin extends and a spring supporting said member, substantially as described.

11. In a car, the combination with a truck having axles and wheels, of an engine yieldingly supported on said truck, said support including a pin having rounded heads, members mounted on the engine and truck having sockets therein in which the heads of said pin are received and a spring supporting one of said members, substantially as described.

12. In a car, the combination of a truck having axles and wheels, of an engine yieldingly supported on said truck, said support including standards mounted on said truck, a block movable vertically and guided by said standards, springs supporting said block and means connecting said block with the engine, substantially as described.

13. In a car, the combination of a truck having axles and wheels, of an engine yieldingly supported on said truck, said support including two sets of leaf-springs mounted parallel to each other on said truck, a block sustained thereby and having a socket therein, a pin extending between said sets of springs and having a rounded head entering said socket and means securing said pin to said engine, substantially as described.

14. In a car, the combination of a truck, a car-body pivotally mounted thereon, a boiler carried by the car-body, a steam-engine mounted on the truck between the axles thereof and connected in driving relation to the truck, flexible connections including ball-and-extension joints for carrying steam from the boiler to the engine, a Stephenson link-gearing controlling the admission of steam to the engine, and means actuated from the car-body for operating said gearing while the truck is in any position relatively to the car-body to reverse the direction in which the engine drives the truck, substantially as described.

15. In a car, the combination of a truck, a car-body pivotally mounted thereon, a steam-engine mounted on the truck and connected in driving relation thereto, means for actuating the valves of the engine, and devices operated from the car-body and connected to said means for reversing the direction in which the engine drives the truck while the truck is in any position relatively to the car-body, substantially as described.

16. In a car, the combination of a bogie-truck, a car-body pivotally mounted thereon, a boiler on the car-body, an engine on the truck connected in driving relation thereto, flexible connections for carrying steam from the boiler to the engine, means for actuating the valves of the engine, and devices operated from the car-body and connected to said means for reversing the direction in which the engine drives the truck while the truck is in any position relatively to the car-body, substantially as described.

17. In a car, the combination of a truck, a car-body pivotally mounted thereon, a steam-engine on the truck between the axles thereof supported at one end on an axle of the truck and connected in driving relation to said axle, springs supporting the other end of the engine, and means operated from the car-body for reversing the direction in which the engine drives the truck, substantially as described.

18. In a car, the combination of a bogie-truck, a car-body pivotally mounted thereon, an engine on the truck connected in driving relation thereto, reversing-gear for said engine and operating means therefor including an arc-shaped member and a part connected but movable relatively thereto, substantially as described.

19. In a car, the combination of a truck, a car-body pivotally mounted thereon, an engine on the truck connected in driving relation thereto, reversing-gear for said engine, an arc-shaped member supported on the car, means for reciprocating said member, and devices connected to said reversing-gear and also connected to said member but adapted to move relatively thereto, substantially as described.

This specification signed and witnessed this 7th day of May, 1906.

WILLIAM G. WAGENHALS.

Witnesses:
S. O. EDMONDS,
D. S. EDMONDS.